(12) United States Patent
Sakohira et al.

(10) Patent No.: US 7,579,730 B2
(45) Date of Patent: Aug. 25, 2009

(54) MOTOR AND MANUFACTURING METHOD THEREOF

(75) Inventors: Kazutaka Sakohira, Kosai (JP); Hiroaki Yamamoto, Toyohashi (JP); Atsushi Nakagawa, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 273 days.

(21) Appl. No.: 11/586,700

(22) Filed: Oct. 26, 2006

(65) Prior Publication Data

US 2007/0103013 A1 May 10, 2007

(30) Foreign Application Priority Data

Nov. 9, 2005 (JP) .............................. 2005-325440

(51) Int. Cl.
*H02K 11/00* (2006.01)
(52) U.S. Cl. ............................ 310/71; 310/89; 310/239; 310/75 R
(58) Field of Classification Search .................. 310/71, 310/68 R, 51, 67 R, 68 B, 239, 89, 75 R
See application file for complete search history.

(56) References Cited

U.S. PATENT DOCUMENTS

| 5,656,878 | A | * | 8/1997 | Nakata | 310/71 |
|---|---|---|---|---|---|
| 5,872,411 | A | * | 2/1999 | Nakata | 310/71 |
| 6,201,326 | B1 | * | 3/2001 | Klappenbach et al. | 310/75 R |
| 6,577,029 | B1 | | 6/2003 | Weber et al. | |
| 6,653,754 | B2 | * | 11/2003 | Uchida et al. | 310/51 |
| 6,787,953 | B2 | * | 9/2004 | Torii | 310/71 |
| 2005/0184606 | A1 | * | 8/2005 | Kokubu et al. | 310/75 R |
| 2005/0280323 | A1 | * | 12/2005 | Amagasa | 310/71 |
| 2006/0043803 | A1 | * | 3/2006 | Yagi | 310/68 B |
| 2006/0113852 | A1 | * | 6/2006 | Adachi et al. | 310/71 |

* cited by examiner

*Primary Examiner*—Thanh Lam
(74) *Attorney, Agent, or Firm*—Posz Law Group, PLC

(57) ABSTRACT

A motor main body includes a brush holder, which holds a plurality of power supply brushes. A control circuit member includes a drive control IC, which controls rotation of the motor main body, and a base, which holds a plurality of terminals that electrically connects between the drive control IC and the plurality of power supply brushes of the brush holder. The base is supported by the brush holder.

12 Claims, 5 Drawing Sheets

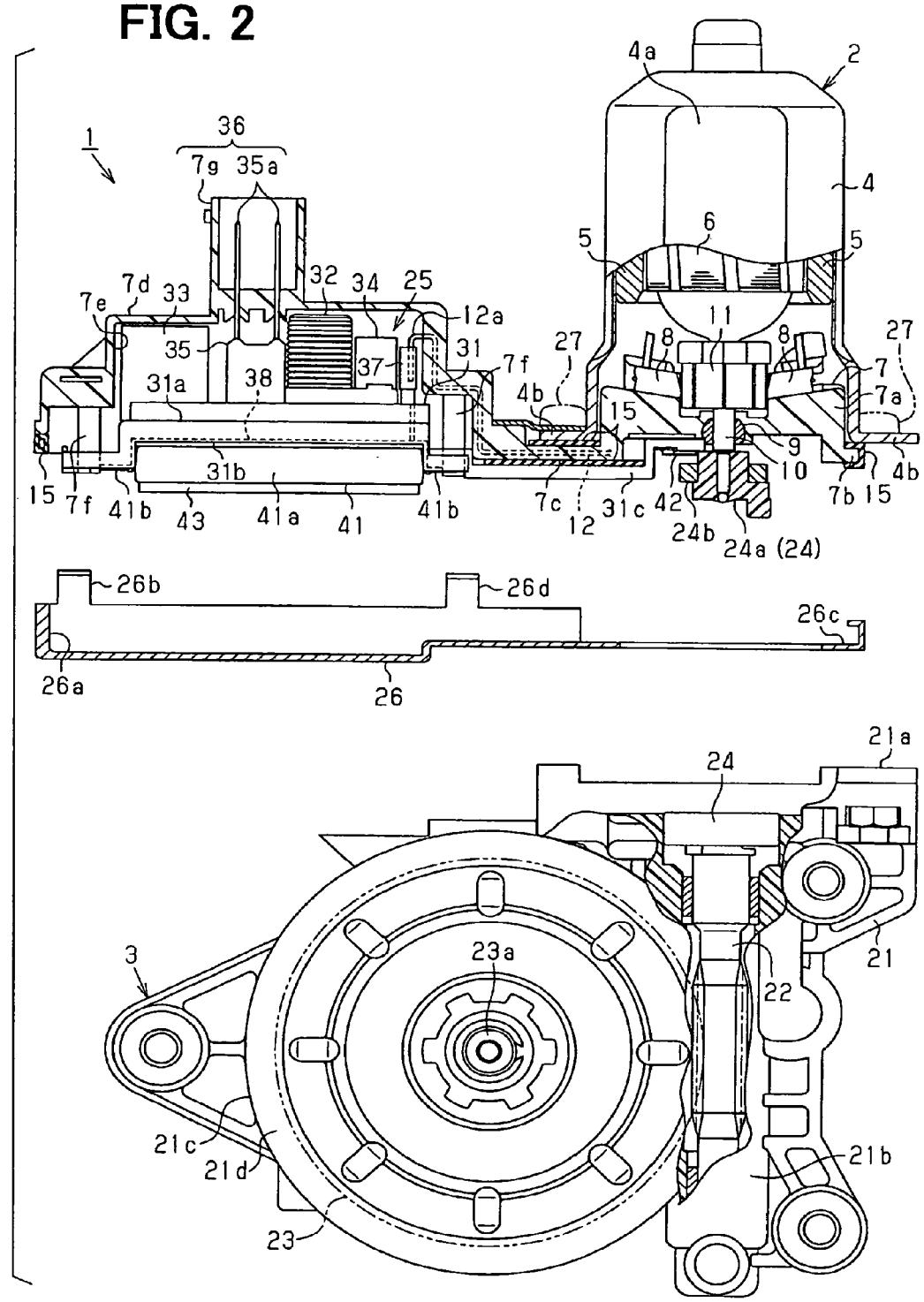

MOTOR AND MANUFACTURING METHOD THEREOF

CROSS REFERENCE TO RELATED APPLICATION

This application is based on and incorporates herein by reference Japanese Patent Application No. 2005-325440 filed on Nov. 9, 2005 and Japanese Patent Application No. 2006-234317 filed on Aug. 30, 2006.

BACKGROUND OF THE INVENTION

1. Field of the Invention

The present invention relates to a motor that has a control circuit member, in which a drive control IC is installed, and also relates to a manufacturing method of such a motor.

2. Description of Related Art

One previously proposed motor, which is used in, for example, a power window system, includes a motor main body, a speed reducer and a control circuit member. The motor main body rotates upon energization thereof. The speed reducer reduces a speed of rotation generated in the motor main body and outputs the rotation of the reduced speed. The control circuit member controls the rotation of the motor main body. Recently, there has been proposed a control circuit member of the above type, which has a drive control IC (an IC, which has a transistor).

For example, Japanese Unexamined Patent Publication No. 2002-511728 discloses a motor, which has no drive control IC. In this motor, terminals, which extend from a receiving member that receives a circuit board of a control circuit member, are connected to the circuit board at a connection. This connection also serves as a supporting structure that supports the circuit board.

In a case where vibrations or shocks, which are applied to the motor, are transmitted to the circuit member, the supporting structure of Japanese Unexamined Patent Publication No. 2002-511728 (corresponding to U.S. Pat. No. 6,577,029B1), which forms the electrical connection of the circuit board and supports the circuit board, receives a large mechanical stress. Thus, in some situations, electrical connections of the circuit board may be broken to cause malfunctioning of the motor.

SUMMARY OF THE INVENTION

The present invention addresses the above disadvantages. Thus, it is an objective of the present invention to provide a motor, which alleviates a mechanical stress applied to an electrical connection of a control circuit member to limit malfunctioning of the motor. It is another objective of the present invention to provide a manufacturing method of such a motor.

To achieve the objectives of the present invention, there is provided a motor, which includes a motor main body and a control circuit member. The motor main body includes a brush holder, which holds a plurality of power supply brushes. The control circuit member includes a drive control IC and a base. The drive control IC controls rotation of the motor main body. The base holds a plurality of terminals that electrically connects between the drive control IC and the plurality of power supply brushes of the brush holder. The base is supported by the brush holder.

To achieve the objectives of the present invention, there is also provided a motor, which includes a motor main body, a gear housing and a control circuit member. The motor main body includes a brush holder, which holds a plurality of power supply brushes. The gear housing receives a speed reducing mechanism, which reduces a speed of rotation generated in the motor main body and outputs the rotation of the reduced speed. The control circuit member includes a drive control IC and a base. The drive control IC controls the rotation of the motor main body. The base holds a plurality of terminals that electrically connects between the drive control IC and the plurality of power supply brushes of the brush holder. The motor main body and the gear housing are assembled together in a state where the base is supported by the brush holder.

To achieve the objectives of the present invention, there is provided a manufacturing method of a motor. According to the manufacturing method, a base of a control circuit member, which holds a plurality of terminals, is installed to a brush holder of a motor main body, which holds a plurality of power supply brushes, so that the base of the control circuit member is supported by the brush holder, and a drive control IC of the control circuit member, which controls rotation of a motor main body, is electrically connected to the brush holder through the plurality of terminals. Then, the motor main body having the brush holder is assembled with a gear housing, which receives a speed reducing mechanism that reduces a speed of rotation generated in the motor main body and outputs the rotation of the reduced speed, after the installing of the base of the control circuit member to the brush holder.

BRIEF DESCRIPTION OF THE DRAWINGS

The invention, together with additional objectives, features and advantages thereof, will be best understood from the following description, the appended claims and the accompanying drawings in which:

FIG. 2 is a cross sectional exploded view of the motor of the first embodiment, showing a state before assembly of the motor;

DETAILED DESCRIPTION OF THE INVENTION

First Embodiment

A motor for a vehicle power window system according to a first embodiment of the present invention will be described with reference to the accompanying drawings.

Figure 1:
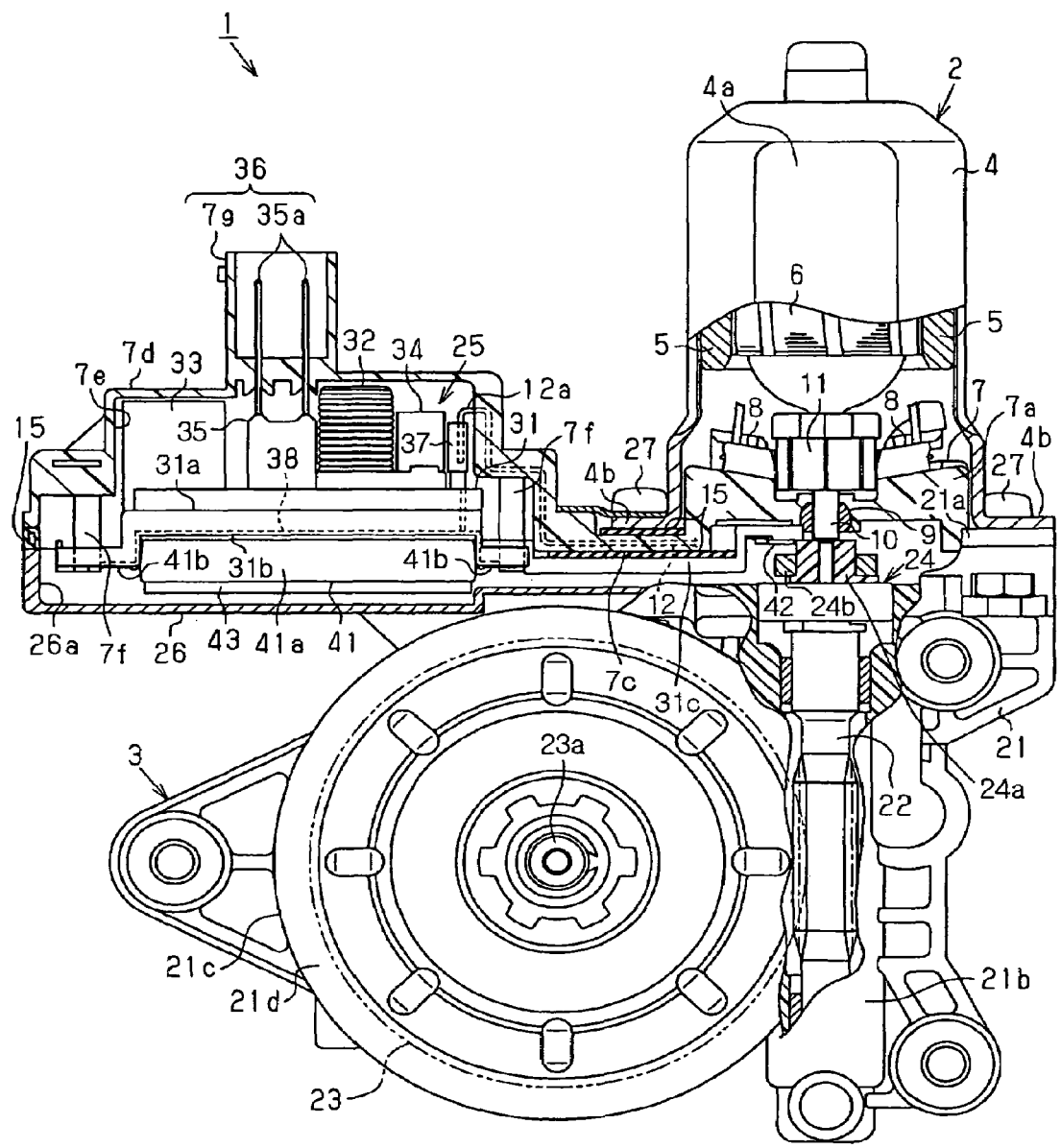
FIG. 1 is a cross sectional view of an assembled motor according to a first embodiment of the present invention.

As shown in FIGS. 1 and 2, the motor 1 of the present embodiment includes a motor main body 2 and a speed reducer (a speed reducing mechanism) 3. The motor main body 2 rotates upon energization thereof. The speed reducer 3 reduces a speed the rotation generated in the motor main body 2 and outputs the rotation of the reduced speed.

The motor main body 2 includes a yoke housing (hereinafter, simply referred to as a yoke) 4, two permanent magnets 5, an armature 6, a brush holder 7 and two power supply brushes 8. The yoke 4 is shaped into a generally flattened cup-shaped body having a closed bottom. The magnets 5 are secured to an inner peripheral surface of the yoke 4. The armature 6 is rotatably supported in the yoke 4.

The brush holder 7 is made of a resin material and includes a holder main body 7a, a flange 7b, an extension 7c and a circuit receiving portion 7d. The holder main body 7a is configured to be substantially received in an opening of the yoke 4. A bearing 9 is fixed to a center hole of the holder main body 7a to rotatably support a distal end of a rotatable shaft 10 of the armature 6. The power supply brushes 8 are slidably held by the holder main body 7a at a yoke 4 interior side of the holder main body 7a in such a manner that the power supply brushes 8 are radially inwardly urged against a commutator 11, which is secured to the rotatable shaft 10 to form an electrical contact therebetween.

The flange 7b extends radially outward from the holder main body 7a in a direction away from the rotatable shaft 10. The extension 7c is located on one lateral side of the yoke 4 and extends from an outer peripheral part of the flange 7b in a direction parallel to a plane of a flat surface 4a of the yoke 4, i.e., extends in an extending direction of a wheel receiving portion 21c with respect to a worm receiving portion 21b of a gear housing 21 described below. The circuit receiving portion 7d, which receives a control circuit member 25, is formed in a distal end of the extension 7c. The control circuit member 25 controls rotation of the motor main body 2. The circuit receiving portion 7d extends in the same direction as the extending direction of the wheel receiving portion 21c with respect to the worm receiving portion 21b of the gear housing 21.

Figure 3A:
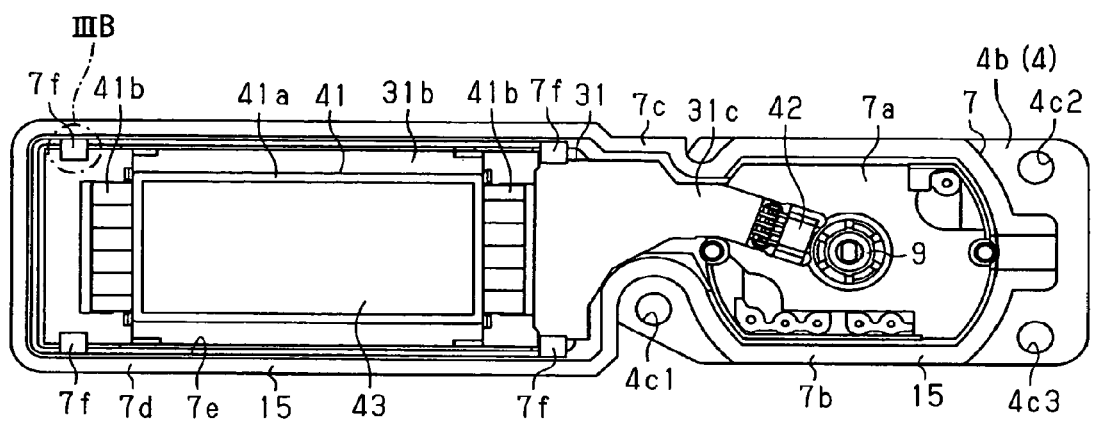
FIG. 3A is an end view showing a gear housing side end surface of a brush holder installed in a motor main body of the motor of the first embodiment.

As shown in FIG. 3A, the circuit receiving portion 7d has a receiving recess 7e, which has a generally rectangular cross section. An upper half of the control circuit member 25 is substantially received in the receiving recess 7e in FIG. 2. A plurality (four in the present embodiment but may be any other number in some cases) of installation pieces 7f is provided in an inner surface of the receiving recess 7e to extend toward an opening of the receiving recess 7e and to hold corners of a base 31 of the control circuit member 25.

Figure 3B:
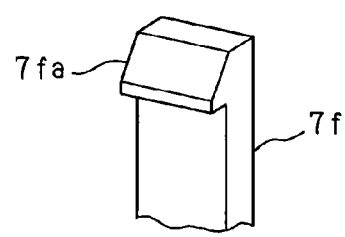
FIG. 3B is an enlarged perspective view of IIIB in FIG. 3A, showing an installation piece of the brush holder.

As shown in FIG. 3B, the installation pieces 7f may be formed as deformable cantilever beams (snap-fit latches), each of which has a hook 7fa at an axial distal free end thereof to engage with a surface of the base 31. The installation pieces 7f in the form of the deformable cantilever beams allow snap-fit of the base 31 of the control circuit member 25 to the installation pieces 7f at the time of installing the control circuit member 25 to the receiving recess 7e in a direction generally parallel to a rotational axis of the rotatable shaft 10 of the motor main body 2. This type of snap-fitting enables detachable fixing of the control circuit member 25 to the receiving recess 7e of the brush holder 7. With this detachable fixing of the control circuit member 25, at the time of malfunctioning of the control circuit member 25, the entire control circuit member 25 may be easily replaced with new one. Furthermore, the above snap-fitting allows easy installation of the control circuit member 25 to the receiving recess 7e of the brush holder 7 in comparison to other type of fixing means, such as screws.

In place of the above cantilever beam snap-fit, a cylindrical type snap-fit (using generally cylindrical projections and generally cylindrical receptacles, which are snap-fitted together), a spherical type snap-fit (using generally spherical projections and generally spherical receptacles, which are snap-fitted together) or any other type of snap-fit may be used. For example, in the case of the cylindrical type snap-fit, the cylindrical projections may be formed to project in the receiving recess 7e in place of the installation pieces 7f, and the cylindrical receptacles may be formed in the base 31 to engage with the cylindrical projections, respectively. Also, in a case of the spherical type snap-fit, the spherical projections may be formed to project in the receiving recess 7e in place of the installation pieces 7f, and the spherical receptacles may be formed in the base 31 to engage with the spherical projections, respectively. Furthermore, if desired, screws or other fixing elements may be used to fix the base 31 of the control circuit member 25 to the receiving recess 7e. Also, if desired, a bonding or fusing technique may be used to permanently fix the base 31 of the control circuit member 25 to the receiving recess 7e.

With reference to FIGS. 1 and 2, a metal cover 26 is installed to the circuit receiving portion 7d (the brush holder 7), which receives the control circuit member 25, through installation pieces 26b, 26c of the metal cover 26 to close the opening of the circuit receiving portion 7d (the receiving recess 7e). The metal cover 26 has a receiving recess 26a that receives the rest of the control circuit member 25.

Furthermore, as shown in FIGS. 1 and 2, a generally quadrangular shaped tubular connector case portion 7g projects at the circuit receiving portion 7d in a direction generally parallel to the axial direction of the rotatable shaft 10. Electrical contacts 35a of a connector main body 35, which is provided in the control circuit member 25, are inserted in an interior of the connector case portion 7g to form a connector 36 of the motor 1.

The flange 7b, the extension 7c and the opening of the circuit receiving portion 7d (the receiving recess 7e) of the brush holder 7 are covered with a seal member 15, which is made of a resilient material, such as elastomer. Specifically, the flange 7b and the extension 7c, which are covered with the seal member 15, are engaged with an opening of the yoke 4 and an opening of a fixing portion 21a of the gear housing 21, to which the yoke 4 is fixed. With this arrangement, the opening of the yoke 4 and the opening of the fixing portion 21a of the gear housing 21 are effectively sealed with the seal member 15, which coves the flange 7b and the extension 7c. The opening of the circuit receiving portion 7d, which is covered with the seal member 15, is engaged with and seals an opening of the cover 26, which closes the circuit receiving portion 7d.

Furthermore, terminals 12, which are made of metal plates, are buried in, i.e., are insert molded into the brush holder 7. Base ends of the terminals 12 are exposed on the yoke 4 interior side of the holder main body 7a and are electrically connected to the power supply brushes 8 through pigtails, respectively. Contacts 12a, which are formed at distal ends of the terminals 12, project into the interior of the circuit receiving portion 7d (the receiving recess 7e) and are electrically connected to the control circuit member 25.

The speed reducer 3 includes the gear housing 21, a worm shaft 22, a worm wheel 23 and a clutch 24. The worm shaft 22 and the worm wheel 23 constitute the speed reducing mechanism.

The gear housing 21 is made of a resin material and includes the fixing portion 21a, the worm receiving portion 21b and the wheel receiving portion 21c. The fixing portion 21a is configured to correspond with the shape of the flange 4b, which is formed at the opening of the yoke 4. The flange 4b is fixed to the fixing portion 21a with screws 27. At this time, the fixing portion 21a cooperates with the flange 4b to clamp the flange 7b and the extension 7c of the brush holder 7 therebetween through the seal member 15. With this construction, the opening of the yoke 4 and the opening of the fixing portion 21a are effectively sealed with the seal member 15.

The worm receiving portion 21b is shaped into a tubular body, which extends along an imaginary extension line of the rotatable shaft 10. The worm receiving portion 21b rotatably supports the worm shaft 22 therein. The clutch 24 is provided to a motor main body 2 side of an interior of the worm receiving portion 21b. The clutch 24 connects between the worm shaft 22 and the rotatable shaft 10 in a manner that allows transmission of a drive force therebetween. Specifically, when the drive force is transmitted from the rotatable shaft 10 to the clutch 24, the clutch 24 transmits the drive force from the rotatable shaft 10 to the worm shaft 22. In contrast, when a drive force is transmitted from the worm shaft 22 to the clutch 24, the clutch 24 blocks rotation of the worm shaft 22 to limit transmission of the drive force from the worm shaft 22 to the rotatable shaft 10. That is, the clutch 24 is provided to limit the rotation of the motor 1, which would be caused by the force applied from a load side (e.g., a load applied to an undepicted window glass in a downward direction) of the power window system. In this way, inadvertent opening movement of the window glass is advantageously limited.

As shown in FIG. 2, at the time of assembling the motor main body 2 (the yoke 4) and the speed reducer 3 (the gear housing 21) together, a driving-side rotatable body 24a, which is a part of the clutch 24, is preinstalled to the distal end of the rotatable shaft 10. Then, at the time of the assembling the motor main body 2 and the speed reducer 3 together, the driving-side rotator 24a is received in a main body of the clutch 24 to complete the assembling of the clutch 24. An annular sensor magnet (a ring magnet) 24b is installed to the driving-side rotatable body 24a to rotate integrally with the driving-side rotatable body 24a. The sensor magnet 24b is provided to sense, for example, a rotational speed of the rotatable body 24a and thereby of the rotatable shaft 10, which is rotated together with the rotatable body 24a.

The wheel receiving portion 21c is shaped into a circular disk like body, which extends from the worm receiving portion 21b. The wheel receiving portion 21c rotatably supports the worm wheel 23 therein. A flat surface 21d of the wheel receiving portion 21c extends continuously from the flat surface 4a of the yoke 4. The gear housing 21 and the yoke 4 are formed to have a low profile to implement a low profile of the entire motor 1. An interior of the worm receiving portion 21b and an interior of the wheel receiving portion 21c are connected with each other at a connection where the worm shaft 22 and the worm wheel 23 are meshed with each other. An output shaft 23a is connected to the worm wheel 23 at one end and is connected to a window regulator (not shown) at the other end. When the motor main body 2 is controlled and is thereby rotated by the control circuit member 25, the output shaft 23a is rotated through the worm shaft 22 and the worm wheel 23 to drive the window regulator, so that the window glass is raised or lowered by the window regulator.

Now, the control circuit member 25, which controls opening and closing of the window glass, will be described further. The control circuit member 25 includes the base 31, which is made of a resin material and is configured into a generally plate form. The base 31 includes mount surfaces 31a, 31b, which are arranged at opposite sides, respectively of the base 31. The base 31 is received in the receiving recesses 7e, 26a in such a manner that the mount surfaces 31a, 31b are perpendicular to the flat surface 4a of the yoke 4 and the flat surface 21d of the wheel receiving portion 21c. Furthermore, the base 31 is held by the installation pieces 7f, which are provided in the receiving recess 7e.

A choke coil 32 and capacitors 33, 34 are mounted to the mount surface 31a of the base 31, which is located on the side of the base 31 that is opposite from the cover 26. The choke coil 32 and the capacitors 33, 34 are provided to limit electromagnetic noise, which is caused by the sliding contact of the power supply brushes 8 and PWM control operation of a drive control IC 41.

The connector main body 35, which supports the electrical contacts 35a, protrudes from the mount surface 31a. Each contact 35a of the connector main body 35 is received in the connector case portion 7g, which is provided in the circuit receiving portion 7d, to form the connector 36 of the motor 1. A vehicle body side connector (not shown) is electrically connected to the connector 36 in the axial direction of the rotatable shaft 10 to provide the electric power from the vehicle body side.

Furthermore, electrical contacts 37 protrude from the mount surface 31a and are engaged with, i.e., are connected to the contacts 12a, which project into the interior of the circuit receiving portion 7d of the brush holder 7. The contacts 37 may be simultaneously engaged with the contacts 12a at the time of installing the control circuit member 25 to the receiving recess 7e of the brush holder 7. When the contacts 37 are connected to the contacts 12a of the brush holder 7, the electric power is supplied from the power supply of the vehicle to the power supply brushes 7 through the connector 36 and the control circuit member 25.

The drive control IC 41 is securely mounted to the mount surface 31b at the cover 26 side (the gear housing 21 side) of the base 31. As shown in FIG. 3A, the drive control IC 41 includes an IC main body 41a and a plurality of electrical lead contacts 41b. The IC main body 41a is shaped into a generally rectangular plate form. The lead contacts 41b protrude from the IC main body 41a in a longitudinal direction of the IC main body 41a. The IC main body 41a includes a drive circuit and a control circuit, which are formed as a single chip or multiple chips and are resin molded. The drive circuit includes, for example, a power MOSFET, which supplies the drive electric current to the motor main body 2. The control circuit performs, for example, the PWM control operation and a pinching limiting control operation for limiting pinching of an object by the window glass. The lead contacts 41b are connected to the circuits of the IC main body 41a. Terminals 38 are buried in, i.e., are insert molded into the base 31, and the lead contacts 41b are welded or soldered to predetermined parts of the terminals 38. Furthermore, the terminals 38 are connected to the choke coil 32 and the capacitors 33, 34. Also, the contacts 35a of the connector 36 and the contacts 37, which are connected to the contacts 12a of the brush holder 7, are formed integrally with the terminals 38.

Furthermore, as shown in FIG. 3A, an extension piece 31c is formed in the base 31 to extend to a point adjacent to the rotatable shaft 10, more specifically to a point adjacent to the sensor magnet 24 of the driving-side rotatable body 24a of the clutch 24. A Hall IC 42 is installed to a distal end of the extension piece 31c. Screw holes 4c1-4c3 are provided to the flange 4b of the yoke 4 to receive the screws 27, respectively. Among the screw holes 4c1-4c3, the screw hole 4c1, which is adjacent to the extension piece 31c, is positioned closer to the widthwise center of the yoke 4 (the vertical center of the yoke 4 in FIG. 3A). The extension piece 31c is bent or curved to bypass the screw hole 4c1, as shown in FIG. 3A. Specifically, the screw hole 4c1 is positioned closer to the widthwise center of the yoke 4 to minimize the number of the screws 27, and the extension piece 31c is bent or curved to allow this positioning of the screw hole 4c1.

The Hall IC 42, which is provided to the distal end of the extension piece 31c, is welded or soldered to predetermined points of the terminals 38 in the base 31, so that the Hall IC 42 is connected to the drive control IC 41 through the terminals 38. The Hall IC 42 senses a rotational position of the driving-side rotatable body 24a and thereby of the rotatable shaft 10, which is rotated integrally with the driving-side rotatable body 24a, based on a change in the magnetic field of the sensor magnet 24b that is rotated together with the driving-side rotatable body 24a. A rotation measurement signal, which indicates the sensed rotational position of the rotatable shaft 10, is outputted from the Hall IC 42 to the drive control IC 41.

The drive control IC 41 senses the rotational position of the rotatable shaft 10 and thereby an operational position (e.g., an open position, an closed position and/or an intermediate position therebetween) of the window glass and/or the rotational speed of the rotatable shaft 10 and thereby the moving speed (e.g., an opening speed and/or a closing speed) of the window glass based on the rotation measurement signal supplied from the Hall IC 42. Based on these measurement signals, the drive control IC 41 performs the PWM control operation of the motor 1 (the motor main body 2) and the pinching limiting control operation for limiting the pinching of the object by the window glass.

A heat sink 43 is fixed to a bottom surface (the cover 26 side) of the drive control IC 41. The heat sink 43 is made of a metal material and is shaped into a rectangular plate form that is slightly smaller than the control IC 41. The heat sink 43 is positioned slightly away from the cover 26. The heat sink 43 efficiently absorbs and releases heat, which is generated from the control IC 41 at the time of driving the motor 1, i.e., at the time of driving the drive control IC 41 to cool the control IC 41.

The control circuit member 25, which has the drive control IC 41, is installed to the installation pieces 7f in the circuit receiving portion 7d of the brush holder 7, and the contacts 37 are connected to the contacts 12a of the brush holder 7. Thereafter, the cover 26 is installed to the circuit receiving portion 7d. Then, the motor main body 2 and the speed reducer 3 are assembled together in such a manner that the brush holder 7 is clamped between the motor main body 2 and the speed reducer 3, so that the motor 1 is assembled.

Next, advantages of the present embodiment will be described.

(1) In the control circuit member 25, which has the drive control IC 41 that controls the motor 1, the terminals 38, which electrically connect between the drive control IC 41 and the brush holder 7, are held in the base 31 of the control circuit member 25. The base 31 is installed to the installation pieces 7f of the brush holder 7, so that the entire control circuit member 25 is supported by the brush holder 7. In this state where the base 31 of the control circuit member 25 is supported by the brush holder 7, the motor main body 2 and the gear housing 21 are assembled together to form the motor 1. In the motor 1 of the present embodiment, separately from the electrical connection (the contacts 37, 12a), which electrically connects between the terminals 38 of the control circuit member 25 and the brush holder 7, the base 31 of the control circuit member 25 is supported by the brush holder 7. Therefore, it is possible to reduce the mechanical stress applied to the electrical connection between the terminals 38 of the control circuit member 25 and the brush holder 7. Furthermore, the control circuit member 25 is stably supported by the brush holder 7. Thus, it is possible to reduce the mechanical stress to the electrical connection between the drive control IC 41 (the lead contacts 41b) and the terminals 38. In this way, it is possible to limit occurrence of breaking of the electrical connections.

(2) The control circuit member 25 is positioned between the brush holder 7 and the gear housing 21, in which a higher degree of freedom in terms of designing of its shape exists. Thus, it is relatively easy to position the control circuit member 25 between the brush holder 7 and the gear housing 21.

(3) The control circuit member 25 is received in the circuit receiving portion 7d, which is provided in the brush holder 7. The base 31 of the control circuit member 25 is supported by the brush holder 7 in the circuit receiving portion 7d of the brush holder 7. With this structure, the control circuit member 25 can be sufficiently protected.

(4) The terminals 38 are buried in, i.e., are insert molded into and are thereby held by the base 31 of the control circuit member 25. Thus, at the time of assembly, it is not required to install the terminals 38 to the base 31, and it is also not required to provide a corresponding installation location for installing the terminals 38.

(5) The Hall IC 42, which serves as a rotation sensor, is integrally held by the base 31 of the control circuit member 25. Thus, it is not required to separately provide a means for holding the Hall IC 42.

(6) The extension piece 31c of the base 31, which holds the Hall IC 42 at its distal end, is shaped to be bent or curved to bypass the screw 27 (the screw hole 4c1), which is used at the time of assembling the motor main body 2 and the gear housing 21 together. Specifically, the extension piece 31c is bent or curved to place the screw 27 (the screw hole 4c1) closer to the widthwise center of the yoke 4, so that the motor 2 and the gear housing 21 can be effectively assembled together with the screws 27.

(7) The heat sink 43, which serves as a heat releasing member, is integrally provided to the drive control IC 41 of the control circuit member 25. Thus, the heat, which is generated from the drive control IC 41, is effectively released through the heat sink 43, and thereby the cooling effect for cooling the drive control IC 41 is improved.

(8) The heat sink 43 of the drive control IC 41 is spaced from the opposed member (the cover 26 in the present embodiment), which is opposed to the heat sink 43. Thus, the heat can be effectively released from the heat sink 43.

Second Embodiment

A motor for a vehicle power window system according to a second embodiment of the present invention will be described with reference to the accompanying drawings.

Figure 4:
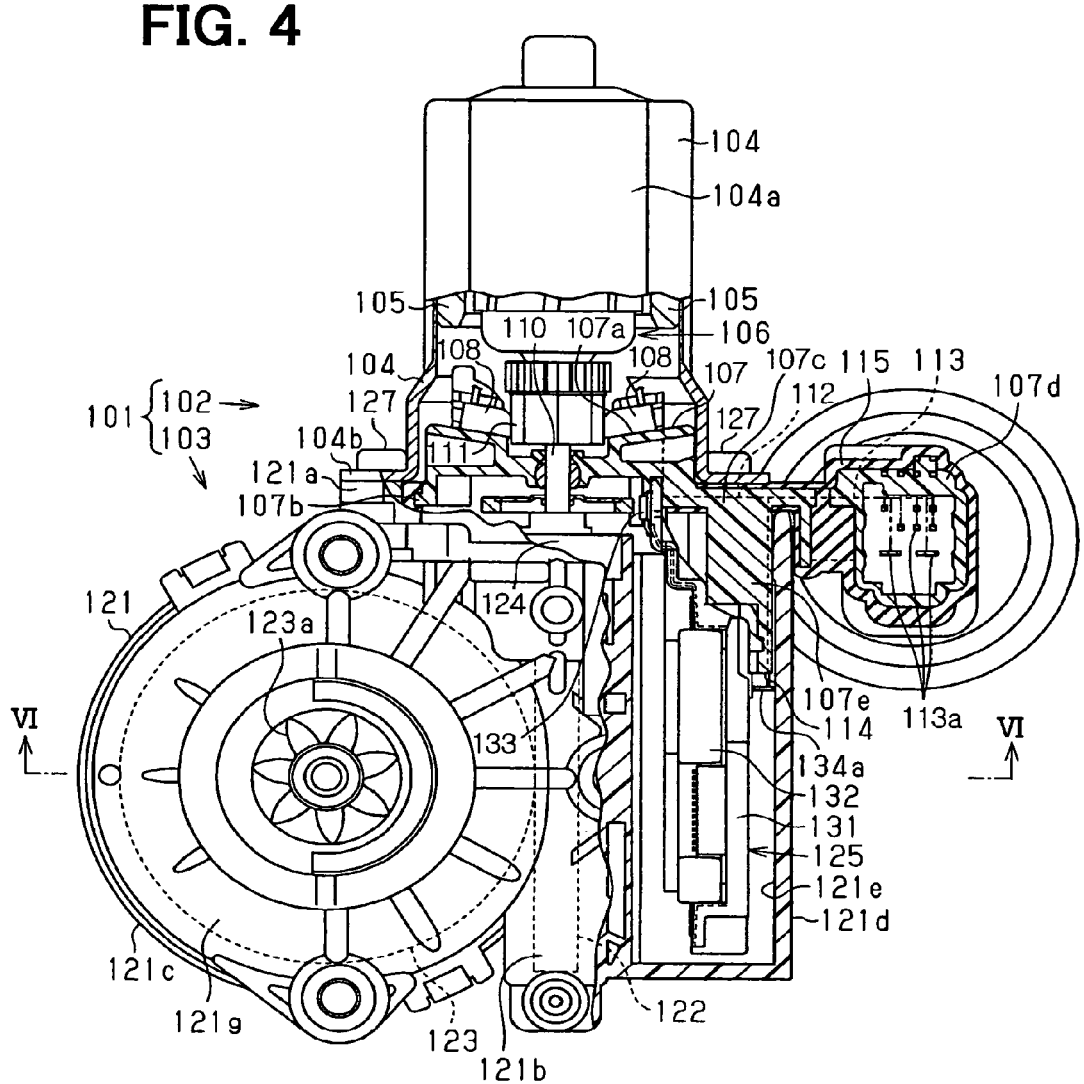
FIG. 4 is a cross sectional view of a motor according to a second embodiment of the present invention.

As shown in FIG. 4, the motor 101 of the present embodiment includes a motor main body 102 and a speed reducer (a speed reducing mechanism) 103. The motor main body 102 rotates upon energization thereof. The speed reducer 103 reduces a speed of the rotation generated in the motor main body 102 and outputs the rotation of the reduced speed.

Figures 5, 6:
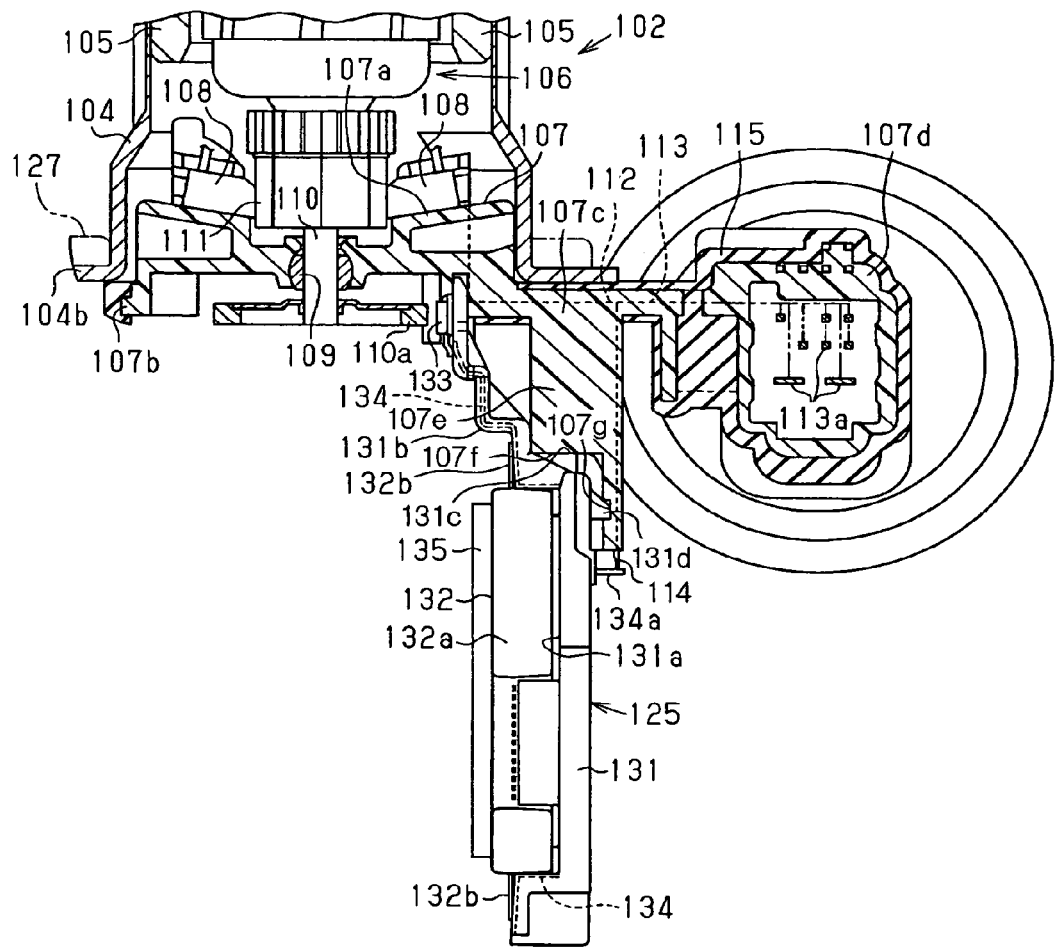
FIG. 5 is a partially cross sectional view of the motor, showing a state before assembly of the motor of the second embodiment.
FIG. 6 is a cross sectional view along line VI-VI in FIG. 4.

As shown in FIGS. 4 and 5, the motor main body 102 includes a yoke housing (hereinafter, simply referred to as a yoke) 104, two permanent magnets 105 (FIG. 5), an armature 106, a brush holder 107 and two power supply brushes 108. The yoke 104 is shaped into a generally flattened cup-shaped body having a closed bottom. The magnets 105 are secured to an inner peripheral surface of the yoke 104. The armature 106 is rotatably supported in the yoke 104.

The brush holder 107 is made of a resin material and integrally includes a holder main body 107a, a flange 107b, an extension 107c, a connector 107d and a supporting portion 107e.

The holder main body 107a is configured to be substantially received in an opening of the yoke 104. A bearing 109 is fixed to a center hole of the holder main body 107a to rotatably support a distal end of a rotatable shaft 110 of the armature 106. The distal end of the rotatable shaft 110 projects outward from the yoke 104, and a sensor magnet 110a is fixed to the projected distal end of the rotatable shaft 110 through a metal plate. The power supply brushes 108 are slidably held by the holder main body 107a at a yoke 104 interior side of the holder main body 107a in such a manner that the power supply brushes 108 are radially inwardly urged against a commutator 111, which is secured to the rotatable shaft 110 to form an electrical contact therebetween.

The flange 107b extends radially outward from the holder main body 107a in a direction away from the rotatable shaft 110. The extension 107c projects outward in a direction parallel to a flat surface 104a (a surface parallel to a plane of FIG. 4 or 5) of the yoke 104 from one end (the right end in FIG. 4 or 5) of the flange 107b, and the connector 107d is formed in a distal end of the extension 107c. The connector 107d is formed to engage with an external connector (not shown) in a direction, which is perpendicular to the flat surface 104a (from the other side of the plane of FIG. 4 or 5 in the direction perpendicular to the plane of FIG. 4 or 5). The supporting portion 107e extends from the extension 107c in the axial direction, which is parallel to the rotatable shaft 110.

A plurality of brush-side terminals 112 and a plurality of connector-side terminals 113 are buried, i.e., are insert molded into the brush holder 107. The brush-side terminals 112 extend from a portion of the holder main body 107a, which is located inside the interior of the yoke 104. The power supply brushes 108 are electrically connected to the base ends of the terminals 112 through pigtails. The connector-side terminals 113 project from the connector 107d to the extension 107c. External connection contacts 113a are formed to the base ends of the terminals 113 in the connector 107d. When the external connector is engaged with the connector 107d, the external connection contacts 113a are electrically connected to the terminals of the external connector.

Each of the distal ends of the brush-side terminals 112 and of the connector-side terminals 113 projects (i.e., is exposed) as an internal connection contact 114 from the supporting portion 107e in the axial direction (the downward direction in FIG. 5) of the motor main body 102. The internal connection contacts 114 extend parallel in the direction perpendicular to the flat surface 104a (the direction perpendicular to the plane of FIG. 5). In FIG. 5, only one of the internal connection contacts 114 is depicted since the internal connection contacts 114 are parallel to each other and are arranged one after another in the direction perpendicular to the plane of FIG. 5.

In the brush holder 107, the flange 107b, the extension 107c and the connector 107d are substantially covered with a seal member 115, which is made of elastomer, except portions, which correspond to the external connection contacts 113a of the connector 107d.

The speed reducer 103 includes a gear housing 121, a worm shaft 122, a worm wheel 123 and a clutch 124. The worm shaft 122 and the worm wheel 123 constitute the speed reducing mechanism.

The gear housing 121 is made of a resin material and includes a fixing portion 121a, a worm receiving portion 121b, a wheel receiving portion 121c and a circuit receiving portion 121d. The fixing portion 121a is formed into a shape, which corresponds to a flange 104b formed in the opening of the yoke 104, and is fixed to the flange 104b with screws 127, so that the flange 107b of the brush holder 107 are clamped between the fixing portion 121a and the flange 104b through the seal member 115.

The worm receiving portion 121b is shaped into a tubular body, which extends along an imaginary extension line of the rotatable shaft 110. The worm receiving portion 121b rotatably supports the worm shaft 122 therein. The clutch 124 is provided to a motor main body 102 side of an interior of the worm receiving portion 121b to couple between the worm shaft 122 and the rotatable shaft 110 in a manner that allows transmission of a drive force therebetween. Specifically, when the drive force is transmitted from the rotatable shaft 110 to the clutch 124, the clutch 124 transmits the drive force from the rotatable shaft 110 to the worm shaft 122. In contrast, when a drive force is transmitted from the worm shaft 122 to the clutch 124, the clutch 124 blocks rotation of the worm shaft 122 to limit transmission of the drive force from the worm shaft 122 to the rotatable shaft 110. That is, the clutch 124 is provided to limit the rotation of the motor 101, which would be caused by the force applied from a load side (e.g., a load applied to an undepicted window glass in a downward direction) of the power window system. In this way, inadvertent opening movement of the window glass is advantageously limited.

The wheel receiving portion 121c is shaped into a circular disk like body, which extends in a direction perpendicular to the worm receiving portion 121b. The wheel receiving portion 121c rotatably supports the worm wheel 123 therein. A flat surface 121g of the wheel receiving portion 121c extends continuously from the flat surface 104a of the yoke 104. The gear housing 121 and the yoke 104 are formed to have a low profile to implement a low profile of the entire motor 101. An interior of the worm receiving portion 121b and an interior of the wheel receiving portion 121c are connected with each other at a connection where the worm shaft 122 and the worm wheel 123 are meshed with each other. An output shaft 123a is connected to the worm wheel 123 at one end and is connected to a window regulator (not shown) at the other end. When the motor main body 102 is controlled and is thereby rotated by the control circuit member 125, the output shaft 123a is rotated through the worm shaft 122 and the worm wheel 123 to drive the window regulator, so that the window glass is raised or lowered by the window regulator.

The circuit receiving portion 121d is provided to the opposite side of the worm receiving portion 121b, which is opposite from the wheel receiving portion 121c. A receiving recess 121e is formed inside the circuit receiving portion 121d to receive the control circuit member 125, which is installed to the brush holder 107, in the axial direction of the rotatable shaft 110. Specifically, the circuit receiving portion 121d (the receiving recess 121e) has its opening on a motor main body 102 side (a brush holder 107 side) of the circuit receiving portion 121d (the receiving recess 121e), and the other axial side of the circuit receiving portion 121d (the receiving recess 121e), which is opposite from the opening of the circuit receiving portion 121d (the receiving recess 121e), is closed.

As shown in FIG. 6, guide grooves 121f are formed to extend in the axial direction in opposed inner surfaces, respectively, of the circuit receiving portion 121d (the receiving recess 121e) to guide lateral edges of a base 131 of the control circuit member 125. The guide grooves 121f guide the lateral edges of the base 131 of the control circuit member 125, so that the guide grooves 121f are provided to limit the movement of the control circuit member 125 in the circuit receiving portion 121d even when shocks or vibrations are applied to the motor 101 from the outside.

Now, the control circuit member 125 will be described in detail. As shown in FIG. 5, the control circuit member 125 includes a drive control IC 132 and a Hall IC 133, which are provided to the base 131 of the control circuit member 125.

The base 131 is made of a resin material and is shaped into a generally plate form. The base 131 includes an abutting portion 131c, which is axially abutted against a contact surface 107f that is provided in the supporting portion 107e of the brush holder 107. An installation projection 131d is formed in the base 131 at a location adjacent to the abutting portion 131c. The installation projection 131d is engaged with an installation recess 107g of the supporting portion 107e to hold the base 131, i.e., the control circuit member 125 in such a manner that the abutting portion 131c is kept abutting against the contact surface 107f.

The drive control IC 132 is installed to a mount surface 131a of the base 131, which is provided on a worm shaft 122 side of the base 131. The drive control IC 132 includes an IC main body 132a and a plurality of lead contacts 132b. The IC main body 132a is shaped into a generally rectangular plate form. The lead contacts 132b extend out of the IC main body 132a along a plane in the longitudinal direction of the IC main body 132a. The IC main body 132a includes a drive circuit and a control circuit, which are formed as a single chip or multiple chips and are resin molded. The drive circuit includes, for example, a power MOSFET, which supplies the drive electric current to the motor main body 102. The control circuit performs, for example, the PWM control operation and a pinching limiting control operation for limiting pinching of an object by the window glass. The lead contacts 132b are connected to the circuits of the IC main body 132a. Terminals 134 are buried in, i.e., are insert molded into the base 131, and the lead contacts 132b are welded or soldered to predetermined parts of the terminals 134. In the drive control IC 132, electrical contacts 134a, each of which forms a part of a corresponding one of the terminals 134, project (are exposed) from the opposite surface of the base 131, which is opposite from the mount surface 131a of the base 131, to connect with the brush holder 107. The electrical contacts 134a are welded or soldered to the internal connection contacts 114, which extend from the brush holder 108.

Furthermore, an extension piece 131b, which extends to a location adjacent to the sensor magnet 110a fixed to the rotatable shaft 110, is formed in the base 131. The Hall IC 133 is mounted to the distal end of the extension piece 131b. The Hall IC 133 is welded to predetermined points of the terminals 134 of the base 131 and is connected to the drive control IC 132 through the terminals 134. The Hall IC 133 senses the rotational position of the rotatable shaft 110 based on a change in the magnetic field of the sensor magnet 110a, which is rotated together with the rotatable shaft 110. The Hall IC 133 outputs a rotation measurement signal, which indicates the sensed rotational position of the rotatable shaft 110, to the drive control IC 132.

The drive control IC 132 senses the rotational position of the rotatable shaft 110 and thereby an operational position (e.g., an open position, an closed position and/or an intermediate position therebetween) of the window glass and/or the rotational speed of the rotatable shaft 110 and thereby the moving speed (e.g., an opening speed and/or a closing speed) of the window glass based on the rotation measurement signal supplied from the Hall IC 133. Based on these measurement signals, the drive control IC 132 performs the PWM control operation of the motor 101 (the motor main body 102) and the pinching limiting control operation for limiting the pinching of the object by the window glass.

A heat sink 135 is fixed to one side surface of the drive control IC 132. The heat sink 135 is made of a metal material and is shaped into a rectangular plate form that is slightly smaller than the control IC 132. The heat sink 135 efficiently absorbs and releases heat, which is generated from the control IC 132 at the time of driving the motor 101, i.e., at the time of driving the drive control IC 132 to cool the drive control IC 132.

The control circuit member 125, which has the drive control IC 132, is installed such that the installation projection 131d of the base 131 is installed to the supporting portion 107e of the brush holder 107, and the connection contacts 134a of the terminals 134 are connected to the internal connection contacts 114 at the brush holder 107 side. Thereafter, the motor main body 102 and the speed reducer 103 are assembled together in such a manner that the control circuit member 125 is received in the circuit receiving portion 121d of the gear housing 121.

Next, advantages of the present embodiment will be described.

(1) In the control circuit member 125, which has the drive control IC 132 that controls the motor 101, the terminals 134, which electrically connect between the drive control IC 132 and the brush holder 107, are held in the base 131 of the control circuit member 125. The base 131 is installed to the supporting portion 107e of the brush holder 107, so that the entire control circuit member 125 is supported by the brush holder 107. In this state where the base 131 of the control circuit member 125 is supported by the brush holder 107, the motor main body 102 and the gear housing 121 are assembled together to form the motor 101. In the motor 101 of the present embodiment, separately from the electrical connection (the contacts 134a and the internal connection contacts 114), which electrically connects between the terminals 134 of the control circuit member 125 and the brush holder 107, the base 131 of the control circuit member 125 is supported by the brush holder 107. Therefore, it is possible to reduce the mechanical stress applied to the electrical connection between the terminals 134 of the control circuit member 125 and the brush holder 107. Furthermore, the control circuit member 125 is stably supported by the brush holder 107. Thus, it is possible to reduce the mechanical stress to the electrical connection between the drive control IC 132 (the lead contacts 132b) and the terminals 134. In this way, it is possible to limit occurrence of breaking of the electrical connections.

(2) The control circuit member 125 is positioned between the brush holder 107 and the gear housing 121, in which a higher degree of freedom in terms of designing of its shape exists. Thus, it is relatively easy to position the control circuit member 125 between the brush holder 107 and the gear housing 121.

(3) The control circuit member 125 is received in the circuit receiving portion 121d, which is provided in the gear housing 121. The base 131 of the control circuit member 125 is supported by the brush holder 107 in the circuit receiving portion 121d of the gear housing 121. With this structure, the control circuit member 125 can be sufficiently protected.

(4) The terminals 134 are buried in, i.e., are insert molded into and are thereby held by the base 131 of the control circuit member 125. Thus, at the time of assembly, it is not required to install the terminals 134 to the base 131, and it is also not required to provide a corresponding installation location for installing the terminals 134.

(5) The Hall IC 133, which serves as a rotation sensor, is integrally held by the base 131 of the control circuit member 125. Thus, it is not required to separately provide a means for holding the Hall IC 133.

(6) The heat sink 135, which serves as a heat releasing member, is integrally provided to the drive control IC 132 of the control circuit member 125. Thus, the heat, which is generated from the drive control IC 132, is effectively released through the heat sink 135, and thereby the cooling effect for cooling the drive control IC 132 is improved.

The above embodiments can be modified as follows.

In the first embodiment, the cover 26, which closes the opening of the circuit receiving portion 7*d* that receives the control circuit member 25, is made of the metal material. Alternatively, the cover 26 may be made of a resin material.

In the first embodiment, the four installation pieces 7*f* are provided to the brush holder 7 to serve as the supporting means for supporting the base 31 of the control circuit member 25. In the second embodiment, the brush holder 107 has the supporting portion 107*e* (mainly the installation recess 107*g* that is engaged with the installation projection 131*d* of the base 131), which serves as the supporting means for supporting the base 131 of the control circuit member 125. The supporting means for supporting the control circuit member (the base) is not limited to the above ones, and for example, the shape, the number and the position of the supporting means (or the supporting elements) may be modified in any appropriate manner. In such a case, the shape of at least one of the base and the brush holder may be modified to form the supporting means.

In each of the above embodiments, the terminals 38, 134 are buried in, i.e., are insert molded into the base 31, 131 of the control circuit member 25, 125. Alternatively, the terminals may be installed or assembled to the surface of the base.

In each of the above embodiments, the Hall IC 42, 133, which serves as the rotation sensor, is integrally held by the base 31, 131. Alternatively, the rotation sensor, such as the Hall IC, may be held by a supporting member that is other than the base.

In each of the above embodiments, the heat sink 43, 135 is provided integrally with the drive control IC 41, 132. Alternatively, the heat sink may be provided separately from the drive control IC. Furthermore, in a case where the cooling of the drive control IC 41, 132 can be effectively performed without the heat sink 43, 135, the heat sink 43, 135 may be eliminated.

In each of the above embodiments, the present invention is implemented in the motor 1, 101 of the power window system. Alternatively, the present invention may be implemented in a motor of a sunroof system, of a slide door system, of a backdoor system or of any other suitable system or apparatus in the vehicle.

Additional advantages and modifications will readily occur to those skilled in the art. The invention in its broader terms is therefore not limited to the specific details, representative apparatus, and illustrative examples shown and described.

What is claimed is:

1. A motor comprising:
a motor main body that includes a brush holder, which holds a plurality of power supply brushes;
a gear housing that receives a speed reducing mechanism, which reduces a speed of rotation generated in the motor main body and outputs the rotation of the reduced speed;
a control circuit member that includes:
a drive control IC, which controls the rotation of the motor main body; and
a base, which holds a plurality of terminals that electrically connects between the drive control IC and the plurality of power supply brushes of the brush holder, wherein the base is supported by the brush holder and is at least partially planar along the brush holder in a direction generally perpendicular to a rotational axis of the motor main body; and
a rotation sensor, which senses the rotations of the motor main body, wherein:
the rotation sensor is held by the base;
the base includes an extension piece, which hold the rotation sensor at a distal end thereof; and
the extension piece is curved in an imaginary plane that is generally perpendicular to the rotational axis of the motor main body to bypass a screw, which is used to connect between the motor main body and the gear housing.

2. The motor according to claim 1 wherein the control circuit member is positioned between the brush holder and the gear housing.

3. The motor according to claim 1, wherein:
the brush holder includes a receiving portion that is integrally formed in the brush holder and receives the control circuit member; and
the base of the control circuit member is supported by the brush holder in the receiving portion of the brush holder.

4. The motor according to claim 2, wherein:
the gear housing includes a receiving portion that is integrally formed in the gear housing and receives the control circuit member; and
the base of the control circuit member is supported by the brush holder in the receiving portion of the gear housing.

5. The motor according to claim 1, wherein:
the base is made of a resin material; and the plurality of terminals is buried in the base.

6. The motor according to claim 1, further comprising a heat releasing member that is provided integrally with the drive control IC.

7. The motor according to claim 6, wherein the heat releasing member, which is provided integrally with the drive control IC, is spaced from an opposed member, which is opposed to the heat releasing member.

8. The motor according to claim 1, wherein the base of the control circuit member is snap-fitted to the brush holder.

9. The motor according to claim 8, wherein:
the brush holder includes a plurality of installation pieces, which extend in a direction generally parallel to a rotational axis of the motor main body; and
the base of the control circuit member is snap-fitted to the plurality of installation pieces in the direction generally parallel to the rotational axis of the motor main body.

10. The motor according to claim 9, wherein each of the installation pieces is formed as a deformable cantilever beam, which has a hook at a distal free end thereof to engage with a surface of the base of the control circuit member and thereby to hold the base of the control circuit member.

11. The motor according to claim 1, wherein the base of the control circuit member is detachably fixed to the brush holder.

12. The motor according to claim 1, wherein the motor main body and the gear housing are assembled together in a state where the base is supported by the brush holder.

* * * * *